United States Patent Office 2,740,176
Patented Apr. 3, 1956

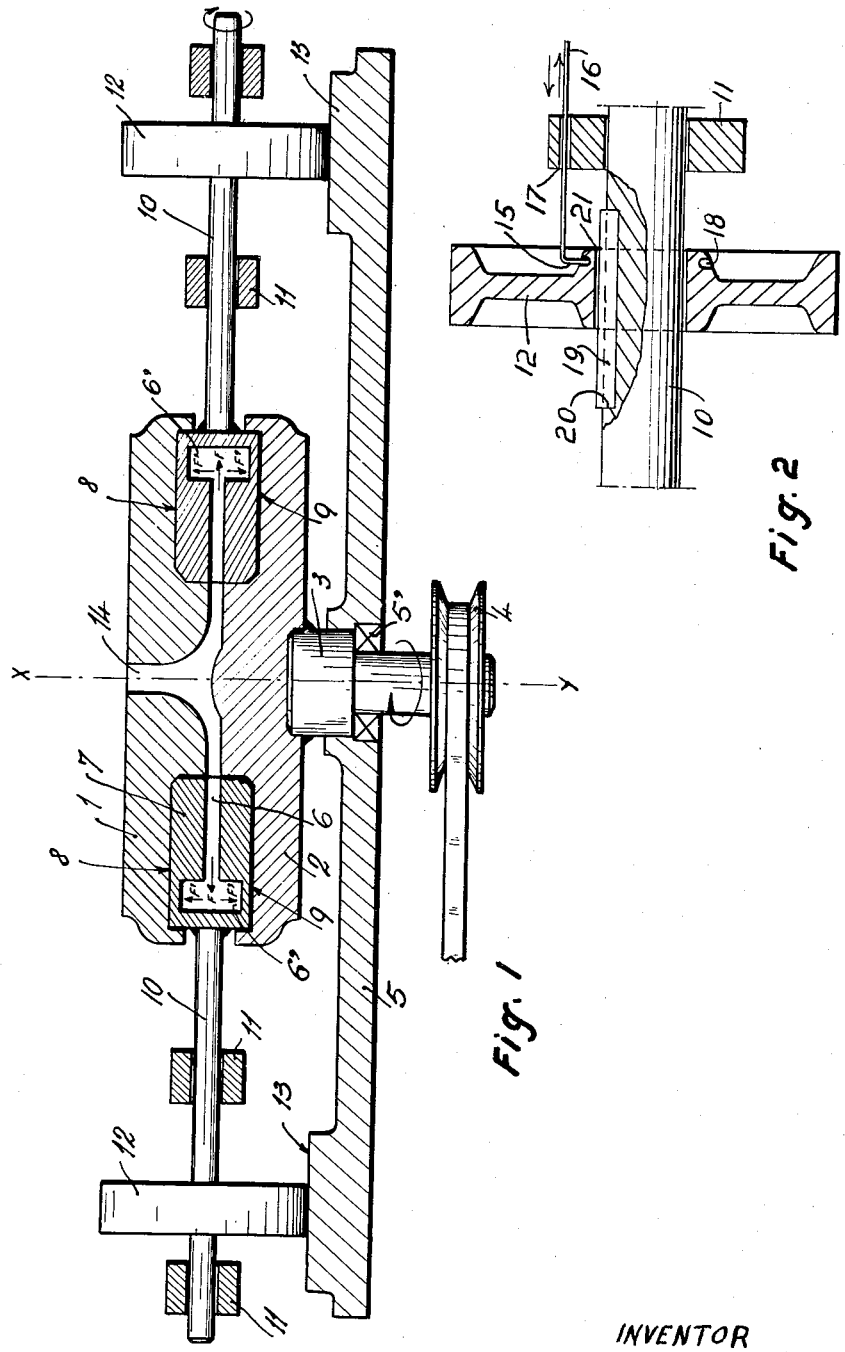

2,740,176

MEANS FOR CENTRIFUGAL MOLDING

Jean Paul Duval, Paris, France, assignor to Max Adolphe Bunford, Monte Carlo, Principauté de Monaco Application June 12, 1953, Serial No. 361,375

Claims priority, application France June 14, 1952

1 Claim. (Cl. 22—65)

It is a well-known fact that in centrifugally operating molding machines, the centrifugal force exerted on the molten material introduced inside the mold projects under pressure said molten material towards those parts of the recesses of the mold which are to be filled therewith, which are the furthest from the axis of rotation of the mold, the material then filling gradually the parts nearer the axis of the mold. However, the material that is submitted to the action of centrifugal force, has always a tendency to move radially away from the axis of the mold.

The different recesses of the mold corresponding to those portions of the article to be molded which extend perpendicularly to the axis of rotation of the mold, are thus easily filled with molten material without any risk of leaving empty air pockets.

In contradistinction, the recesses in the mold which correspond to those portions of the article to be molded which are parallel with the axis of rotation, run the risk of not being completely filled with material distributed in a homogeneous manner. This drawback, which is a serious one, as it may lead to the formation of shrinkage holes in the molded article, is all the more dangerous when the article to be molded includes portions projecting inwardly towards the center of the mold. To such parts of the article correspond, as a matter of fact, inside the mold, recesses facing a direction opposing centrifugal force, so that said centrifugal force is not capable of filling said recesses completely with molten material.

In order to cut out the production of defective molded articles due to this drawback and, generally speaking, with a view to improving the structure of the molded article, I have imagined, according to the present invention, to associate with the first main centrifugal action obtained by causing the mold to revolve round its axis in the usual manner, a second centrifugation the direction of which is perpendicular to that of the first main centrifugation or is more or less inclined with reference thereto, said second centrifugation being produced through the rotation round their axes of shells revolubly fitted inside the actual mold and defining inwardly at least part of the recesses inside which the article is to be molded.

Considering e. g. one of the recesses of the mold, formed inside such a shell, and assuming that this recess includes sections directed in parallelism with the axis of rotation of the mold and even further sections directed towards the axis of the mold, it will be readily ascertained that, if the first centrifugal action exerted in a direction perpendicular to the axis of rotation of the mold projects the molten material in said direction, the second centrifugal action, exerted perpendicularly to the former, i. e. in parallelism with the axis of rotation of the mold, or again, in a direction that is more or less inclined with reference to the latter, according to the direction given to the axis of rotation of the shell considered, has, on the contrary, for its result to project the molten material in a direction in which the first centrifugation cannot be operative.

The recess considered may, therefore, be entirely filled without any air pockets being left and, furthermore, the association of two centrifugations in different directions produces a stirring of the molten material inside the mold, which leads to a highly improved structure of the molded articles.

The speeds of rotation of the mold on one hand and of the shell or shells on the other hand, may be equal or different.

The speed of rotation of the shell or shells may be uniform or else, increase or decrease gradually.

The two centrifugations may be simultaneous, throughout the duration of the molding, or else, each of the centrifugations may begin and/or stop before the other.

There is thus available for the operator a large number of combinations for the application of my double centrifugation and said operator may thus select the most suitable combination according to the type, shape and arrangement of the particles to be molded.

Any suitable mechanical means may be resorted to for executing the second centrifugation, i. e. for producing the rotation round their axes of the shell or shells inserted for this purpose inside the mold, the rotation being preferably controlled by the shaft driving the mold into rotation and acting as the driving member for the shells.

In accompanying drawing,

Fig. 1 illustrates diagrammatically a preferred embodiment of my improved mold providing for double centrifugation, and Fig. 2 is an enlarged detailed view partly in section of a spindle disconnecting and modifying means for said mold.

In said embodiment, given by way of a mere exemplification, 1 and 2 designate the two cooperating plates of the mold which may be readily assembled together through any known means, while 3 designates the driving shaft controlling the rotation of the mold round its axis X—Y, said shaft being driven through a belt and the pulley 4, a roller bearing 5' being fitted inside a stationary carrier plate 5 to carry the shaft 3.

It is assumed that the shapes of the articles to be molded correspond to the hollow shape of the recess shown at 6, i. e. they include sections 6' extending in parallelism with the axis X—Y of centrifugation.

There may be provided as many as four recesses 6, or even more, distributed round the axis of the mold and each of which is formed inside a shell 7 which may be constituted by one or two parts.

Each shell 7 is fitted inside the corresponding recesses 8, 9 formed in the cooperating plates 1, 2 of the mold and it carries outwardly a spindle 10 which is held inside bearings 11 carried by extensions from said mold plates 1 and 2. Each spindle 10 is keyed to a roller 12 adapted to revolve frictionally over a bearing surface 13 rigid with the stationary carrier plate 5. 14 designates the opening through which the molten metal is cast inside the mold.

When the shaft 3 revolves in the direction of the corresponding arrow, centrifugal forces urge the molten metal fed through 14, in the direction of the radial arrow F, i. e., away from the axis of the mold, and towards the terminal wall of each recess 6' extending in parallelism with the axis X—Y.

Now, at the same time, each roller 12 is frictionally driven so that it is constrained to roll over the surface 13; its spindle 10 revolves constantly round its axis in the direction of the arcuate arrow on the right hand side of the drawing, so as to drive along with it the corresponding shell 7. The molten metal is thus submitted to the action of an auxiliary centrifugation in the direction of the arrows F', which centrigugation urges the metal against the walls of each recess 6' extending in a direction perpendicular to the axis X—Y in the enlarged terminal portion of said recess.

The molten metal which is thus stirred energetically under the action of said double centrifugation, fills consequently the whole recess 6 without leaving any air pocket therein.

Rollers 12 can be shifted along the spindle 10 in order to vary the rotary speed of said spindle and thereby vary the pressure produced by this second or auxiliary centrifugation. Note particularly Fig. 2 wherein a bent end portion 15 of a control rod 16 longitudinal slidable through a lateral opening 17 of one of the bearings 11 rides in an annular groove 18 in the hub of roller 12. A key 19 is mounted within a longitudinal peripheral recess of spindle 10 and slidably extends within slot 21 of the hub of said roller. Thus an operator by moving rod 16 can move roller 12 laterally thereof and longitudinally and spindle 10 varying the distance of roller 12 from shaft 3 for increasing or slowing the rotation of said roller and consequently spindle 10 or by moving roller 12 off of the bearing surface 13, said roller is disconnected therefrom and will not accordingly be rotated until returned thereto.

It is also possible to substitute for this frictional drive of the spindle 10, a positive drive through pinions engaging a stationary annular toothed wheel.

I may also give each shell 7 and the corresponding spindle 10 an angular setting with reference to horizontality inside the mold, while retaining for the actual recess 6' a horizontal position so that the second centrifugation may be produced in a direction which is no longer perpendicular but oblique with reference to the first centrifugation and, in fact, it may be directed towards the axis X—Y.

It is possible to insert any known type of clutch and change speed gear between the main shaft 3 and the spindle 10, so as to make the latter revolve when desired and at the desired speed.

Lastly, I may make the spindles 10 revolve under the action of control means independent of the shaft 3.

What I claim is:

A device for the centrifugal molding of articles out of molten material, comprising a rotary driving shaft, a mold coaxially rigid with said shaft and including a body defining an inner cavity, means for feeding molten material into said body, a plurality of shells distributed around the axis of the shaft and mold and the recesses of which open into the cavity of said mold and define therewith the shape to be given to the molded articles, said recesses including in each shell at least one part directed angularly with reference to a plane perpendicular to the axis of said mold, spindles extending radially with reference to the axis of said mold and rigid with the corresponding shells and means operatively connecting said driving shaft with the different spindles and including means for disconnecting and modifying the speed of said spindles with reference to said driving shaft.

References Cited in the file of this patent

UNITED STATES PATENTS

| 1,320,910 | Perry | Nov. 4, 1919 |
| 1,817,012 | Merle | Aug. 4, 1931 |
| 2,428,434 | Rubissow | Oct. 7, 1947 |
| 2,433,065 | Rubissow | Dec. 23, 1947 |
| 2,495,483 | Rubissow | Jan. 24, 1950 |